United States Patent [19]

Bradley et al.

[11] Patent Number: 4,515,919

[45] Date of Patent: May 7, 1985

[54] PROTECTIVE COATING COMPOSITION AND PROCESS FOR ALUMINUM AND ALUMINUM ALLOYS

[75] Inventors: Robert E. Bradley, Temple, Ga.; William R. Keithler, Kirkwood, Mo.

[73] Assignee: Lockheed Corporation, Burbank, Calif.

[21] Appl. No.: 493,062

[22] Filed: May 9, 1983

[51] Int. Cl.³ .............................................. C08L 75/04
[52] U.S. Cl. ................... 524/591; 204/37.1; 204/38.7; 204/38.3; 427/388.2; 427/388.4; 427/409; 427/419.5; 524/840
[58] Field of Search ............. 524/591, 840; 204/37 R, 204/38 E, 38 A; 427/388.2, 388.4, 409, 419.5

[56] References Cited

U.S. PATENT DOCUMENTS

| | | | |
|---|---|---|---|
| 4,097,677 | 6/1978 | Emmons et al. | 525/10 |
| 4,203,883 | 5/1980 | Hangauer | 524/591 |
| 4,310,390 | 1/1982 | Bradley et al. | 427/419.5 |
| 4,425,468 | 1/1984 | Makhlouf et al. | 525/459 |

Primary Examiner—Maurice J. Welsh
Attorney, Agent, or Firm—Eric R. Katz

[57] ABSTRACT

A protective coating composition and process is described for simultaneously sealing and priming the anodic coating applied to aluminum and alloys thereof without the need for elevated temperatures during a subsequent curing step. The composition comprises a colloidal, water-borne polyurethane resin which is an aromatic, aliphatic or alicyclic copolymer. The composition is curable at ambient temperatures but may include a cross-linking agent as well as a thermosetting catalyst. The process comprises the steps of anodizing the component to be coated, applying the coating composition at elevated temperatures to thereby simultaneously seal and prime the component and curing the sealed and primed component at ambient temperatures. If cross-linking agents are employed then elevated cure temperatures are utilized.

10 Claims, No Drawings

PROTECTIVE COATING COMPOSITION AND PROCESS FOR ALUMINUM AND ALUMINUM ALLOYS

TECHNICAL FIELD

The present invention generally relates to protective coating compositions and processes to provide corrosion protection for metals and more particularly to a composition and process for simultaneously sealing and priming the anodic coating applied to aluminum and alloys thereof without the need for elevated temperatures during a subsequent curing step.

BACKGROUND ART

Known processes for applying corrosion resistant protective coatings on aluminum substrates are typically sequential in nature and utilize a chemical or electrochemical surface treatment followed by the application of an organic primer. The aluminum substrate or component is first anodized, then sealed through hydration and subsequently the sealed anodic coating is coated, typically with an organic primer.

The multiple separate and distinct process steps of the above-noted coating operation result in a build-up of layers which creates dimensional problems due to the film thicknesses of the anodic coating and the primer. This build-up of layers results in an ultimate coating having a durability which is critically dependent on the degree of chemical/mechanical bonding between layers. Moreover, the entire operation for producing the multilayered coating requires an appreciable amount of time and labor.

In an attempt to overcome the shortcomings of the known coating processes, the inventors of the present invention disclosed in Bradley et al. U.S. Pat. No. 4,310,390, assigned to the assignee of the present application, a protective coating process which reduces the number of process steps required to form a protective coating. The reduction of process steps is achieved by introducing a water-borne, water soluble acrylic resin into the sealing step of an otherwise conventional anodizing sequence to thereby simultaneously seal and impregnate the anodic coating. Subsequent to the sealing step, however, the resultant coating is cured at elevated temperatures up to 500° F. The requirement of a heating step is not only costly in terms of production time and energy, but requires the maintenance of a precisely controlled temperature/time range which is difficult to achieve.

DISCLOSURE OF THE INVENTION

It is, therefore, an object of the present invention to provide an improved coating composition and a simplified process to produce a protective coating for providing corrosion protection for metals whereby the anodic coating applied to aluminum and alloys thereof is simultaneously sealed and impregnated at temperatures in excess of about 170° F., in a time/temperature relationship, the coating being cured without the need for elevated cure temperatures.

It is another object of the present invention to provide a protective coating composition and process wherein effective cross-linking agents can be used to produce a cured protective coating having further enhanced organic solvent resistance and other desirable properties with respect to hardness, elongation and tear resistance.

One advantage of the present invention is that the coating composition of this invention will form cured coatings at room temperature, having excellent resistance to corrosive environments.

Another advantage of the present invention is that it is relatively non-polluting since little, if any, organic volatile material need be present in the coating composition.

Yet another advantage of the present invention is that it provides a protective coating having improved stability at elevated temperature.

A further advantage of the present invention is that it provides a protective coating having the ability to easily accept topcoats.

Still another advantage of the present invention is the elimination of heat curing after sealing, thus further reducing the time and the cost of production.

In accordance with these and other advantages, objects and features of the present invention, there is provided an organic protective coating composition which, prior to application to the anodic coatings, is a colloidal, water-borne urethane elastomer such as a polyurethane resin adapted for introduction during the sealing step of a typical anodizing process. The colloidal polyurethane resin, when applied to an unsealed anodic coating at elevated temperatures, simultaneously seals the anodic coating to its monohydrate/trihydrate form and impregnates the sealed anodic coating with the resin. Subsequently, the resin is chemically cross-linked at ambient temperatures thereby eliminating the need for elevated temperatures during curing.

The preferred water dispersible polyurethane resin of this invention is an aromatic, aliphatic or alicyclic isocyanate copolymer which may contain certain corrosion inhibitors such as zinc, strontium, calcium, sodium, potassium, as well as other soluble or insoluble chromates, dichromates, tungstates or molybdates including amine complexes of molybdic or tungstic acids and organic titanate complexes.

The polyurethane resin of the present invention is comprised of various reacted isocyanate prepolymers based on such monomers as 2,4-toluene diisocyanate; 2,6-toluene diisocyanate; 1,4-cyclohexane diisocyanate; dicyclohexylmethane; 4,4'-diisocyanate; xylene dissocyanate; 1-isocyanate-3-isocyanatomethyl-3,5,5-trimethylcyclohexane, hexamethylene diisocyanate; methylcyclohexyl dissocyanate; 2,4,4-trimethylhexylmethylene diisocyanate and the like.

In accordance with an alternative embodiment of the present invention, melamine is added to the coating composition and the coating cured at elevated temperatures to provide a more chemically resistant protective coating.

In accordance with the present invention, there is also provided a protective coating process for aluminum alloy components comprising the steps of anodizing the component to be coated, applying a coating composition comprising a colloidal, water dispersible urethane elastomer resin, such as a polyurethane resin, to the anodized component at a temperature range of approximately 170° F. to 200° F. for a period ranging from about 30 to about 60 minutes, the time and temperature being inversely related whereby the composition seals and primes the anodized component providing a surface coating capable of being cross-linked at ambient temperatures thereby eliminating the need for elevated temperatures during a subsequent curing step.

The process of the present invention further comprises the step of adding a nitrogeneous cross-linking agent during the applying step and subsequently curing the sealed and primed component at an elevated cure temperature.

BEST MODE FOR CARRYING OUT THE INVENTION

The present invention relates to a composition and process for sealing anodic coatings on aluminum and aluminum alloy substrates, while simultaneously impregnating the anodic coating with an organic resin during the sealing operation. The protective coating composition, when applied to the anodized substrate, among other things, provides superior corrosion resistant characteristics.

In the process of the invention, a colloidal, waterborne resin material, such as a polyurethane resin, possessing excellent stability at temperatures in excess of 170° F., is used to convert the unsealed anodic coating to the monohydrate/trihydrate form of aluminum oxide, during the sealing step of an otherwise conventional aluminum anodizing process. The sealed anodic coating will cure at ambient temperatures, however, depending upon the formulation or composition of the sealing bath, may be cured at temperatures of up to about 500° F. This process provides a total protection system that has characteristics superior to separately anodized and organically primed aluminum, obtained through conventional processes.

The protective coating composition of the present invention comprises an urethane elastomer resin formed from an aromatic, aliphatic or alicyclic isocyanate copolymer dispersed in water. The coating composition may contain such corrosion inhibitors as zinc, strontium, calcium, sodium, potassium and other soluble or insoluble chromates, dichromates, tungstates or molybdates including amine complexes of molybdic or tungstic acids and organic titanate complexes.

Preferably the water dispersible urethane elastomer resin is a polyurethane resin which comprises various reacted isocyanate prepolymers based on such monomers as 2,4 toluene diisocyanate; 2,6 toluene diisocyanate; 1,4-cyclohexane diisocyanate; dicyclohexylmethane; 4,4'-diisocyanate; xylene diisocyanate; 1-isocyanato-3-isocyanatomethyl-3,5,5-trimethylcyclohexane; hexamethylene diisocyanate; methylcyclohexyl diisocyanate; 2,4,4-trimethylhexylmethylene diisocyanate and the like. While aromatic diisocyanates are employed as the diisocyanate component, they are generally less preferred in some applications due to yellowing which results from exposure to ultraviolet light or where hydrolytic stability is important. The aliphatic and alicyclic diisocyanates generally exhibit excellent resistance to the degradative effects of ultraviolet light and therefore these aliphatic and alicyclic diisocyanates are preferred.

It is appreciated that the polyurethane resin is a copolymer and therefore it is desirable to utilize a mixture of the above-noted monomers in order to provide various properties to the ultimate coating composition such as improved corrosion resistance, chip resistance, adherence, gloss, flexibility, durability, hardness, flow and solvent resistance.

The polyurethane resin of the protective coating composition is any of a variety of various synthetic rubber polymers produced by the polymerization of a hydroxyl radical and an NCO group from two different compounds. The polyurethane resin of the present invention is based on the aforementioned monomers and comprises, for example, a stable, aqueous colloidal dispersion of urea-urethane polymer salt. The dispersion is infinitely dilutable with water and the polymer salt comprises a tertiary amine salt of urea-urethane polymer prepared by reaction with a carboxylic group containing isocyanate-terminated urethane prepolymer and polyamine. The prepolymer is the reaction product of polyisocyanate and a polyol having sufficient carboxylic groups which are relatively non-reactive with isocyanate to provide the prepolymer with an acid value of about 17 to 6 C on an unneutralized basis. The polyisocyanate is selected from the group comprising aromatics, aliphatics or alicyclics and after neutralization with a primary, secondary or tertiary amine provides a stable, aqueous colloidal dispersion.

The preferred amine neutralizer is a triamine having at least two amine groups selected from the group comprising primary amine groups and secondary amine groups reactive with isocyanate groups. The polyamine has on the average of at least 2.2 amine nitrogen atoms having active hydrogen per molecule of polyamine.

The coating composition is, preferably, one having a basic pH in the range of 8 to 9. This pH is adjustable with either nitrogen containing materials or water soluble salts. Due to the processing temperature, high boiling polyamines are preferred.

The colloidal polyurethane resin used in this invention forms a cured protective coating at room temperature, the coating providing good resistance to water and organic solvents. The coating is relatively nonpolluting since little, if any, organic volatile material need be present in the composition. Apparently, when the dispersion is cured as a film, cross-linking occurs due to the use of the triamine-containing solubilizing agent, and the resulting coatings have enhanced organic solvent resistance and other desirable properties with respect to hardness, elongation and tear resistance.

Since, at elevated curing temperatures, some of the polyamine groups are detached from the isocyanate chain, effective cross-linking agents can be used to produce even harder, more resistant polymeric films. While a number of cross-linking agents can be employed, aziridine or a substituted melamine is most effective. The disadvantage with aziridine is its transience, particularly at the high processing temperatures required. Therefore, the more practical is the substituted melamines and the preferred is hexamethoxyl methyl melamine.

Therefore, according to one embodiment of the present invention, the coating composition also contains an effective cross-linking agent. The basis for selecting the cross-linking agent is that it has high temperature stability and that it is reasonably stable in the presence of corrosion resistant pigments that are needed to the composition.

The amount of cross-linking agent is directly proportional to the number of carboxylic groups present in the isocyanate copolymer. The temperature required for a complete cure of the isocyanate/melamine mixture is about 300° F. to about 500° F. for a period ranging from about 10 minutes at the lower temperature to about 1 minute at the higher.

In order to achieve lower cross-linking temperatures, it is desirable to add a thermosetting catalyst to the isocyanate coating composition. Preferred catalysts are Friedel-Krafts acid catalysts, boron trifluoride or a titanate complex comprising pyrophosphate titanate or phosphite titanate. The use of the phosphite titanate markedly improves the chemical resistance of the isocyanate coating composition. The method for accelerating the cure using a titanate is:

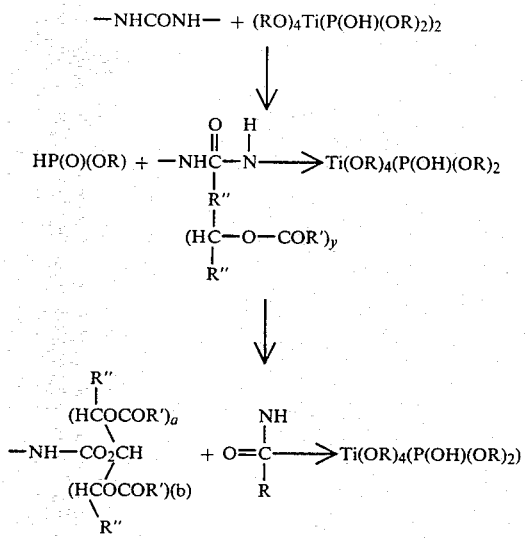

by coordinated nitrogen ligand exchange for either nitrogen or phosphorous ligands. In the above formulation, R is an alkyl group having from 3 to 12 carbon atoms, R' is an unsaturated or polysaturated ligand of about 2 to about 17 carbon atoms, and R" is a hydrogen or an alkyl group of about from 1 to 8 carbon atoms, $2 \geq Y \geq 6$, and $a+b=Y-1$.

The titanate is quaternized with an amine such as 2-amino-2-methyl-1-propanol so as to become water miscible. Alternatively, the titanate is emulsified using a suitable emulsifier, i.e. sodium dodecylbenzenesulfonate (anionic), cetyl trimethyl ammonium bromide (cationic) or an ethoxylated nonyl phenol (non-ionic). The amount of titanate to be added ranges from about 0.1% to about 8.0% by weight, based on resin solids.

Preferred Friedel-Kraft acid catalysts are added in an amount ranging from about 1% to about 10% by weight based on the resin solids. Suitable acid catalysts are para toluene sulfonic acid, n-butyl acid phosphate, dodecyl succinic acid, phosphoric acid and various acid salts, such as sodium acid phosphate, sodium bisulphate and the like.

To prevent premature gellation or other instability, it is necessary to react the acid with a stoichiometric quantity of secondary or tertiary amine. This renders the acid water soluble and prevents the premature reaction with the isocyanate component.

It has also been found desirable to add a free radical inhibitor to minimize hydolysis or other reactions that promote the instability of the resin coating composition. These inhibitors are added in amounts of about 1% to about 10% by weight based on the total solid weight of the coating composition. Suitable inhibitors are hydroquinone, guiacol, methyl-p-amino benzoate, propyl gallate and the like.

In addition, the coating composition may contain various corrosion inhibitive pigments which impart substantially improved corrosion resistance to the coated surface. These pigments are either water soluble or they are water insoluble. Metallic salts of the Group VI-B of the periodic table are preferred corrosion inhibitors.

Suitable corrosion inhibitors are chromates such as zinc chromate, potassium chromate, potassium dichromate, sodium chromate, sodium dichromate, calcium chromate, ammonium chromate and ammonium bichromate; tungstates such as sodium tungstate, potassium tungstate, and ammonium tungstate; molybdates, such as sodium molybdate, potassium molybdate and ammonium molybdate. In addition, complex compounds of chromium, molybdenum and tungsten acceptable as well as titanium, including lead silico chromate, amine salts of tungstic and molybdic acid and phosphite or phosphate titanium chelates as described hereinabove.

A preferred formulation is one comprised as follows:

| Formulation A | |
|---|---|
| Aliphatic, water dispersion of polyurethane | 2.25 Parts by weight |
| Strontium chromate | 2.5 Parts by weight |
| Propyl gallate | .002 Parts by weight |
| Water | 5.248 Parts by weight |

| Formulation B | |
|---|---|
| Colloidal water dispersion of polyurethane | 1.25 Parts by weight |
| Zinc chromate | 2.0 Parts by weight |
| Hexa methoxy methyl melane | 1.0 Parts by weight |
| Guiacol | .1 Parts by weight |
| Para toluene sulfonic acid* | .24 Parts by weight |
| Water | 5.41 Parts by weight |

*Para toluene sulfonic acid and all Friedal-Krafts acid catalysts are neutralized to pH 7.5 with Diethyl amino ethanol and diluted to 25% weight solids, active acid.

| Formulation C | |
|---|---|
| Colloidal dispersion of aromatic or aliphatic polyurethane | 1.5 Parts by weight |
| Sodium dischromate | .5 Part by weight |
| Methyl para amino benzoate | .05 Part by weight |
| Hexa methoxyl methyl melamine | .8 Part by weight |
| Phosphito titanate | .05 Part by weight |
| Water | 7.1 Part by weight |

Note: All formulations are adjusted, after manufacture, to pH 8.0 to 8.5 with 2-amino-2-methyl-1-propanol.

| Formulation D | |
|---|---|
| Colloidal dispersion of aliphatic or aromatic polyurethane | 2.5 Parts by weight |
| Molybdic acid/Diethyl amino ethanol complex | .5 Part by weight |
| Hydroquinone | .05 Part by weight |
| Water | 6.95 Part by weight |

| Formulation E | |
|---|---|
| Colloidal dispersion of aliphatic or aromatic polyurethane | 3.5 Parts by weight |
| Phosphito titanate* | .8 Part by weight |
| Guiacol | .08 Part by weight |
| Water | 5.62 Parts by weight |

*The phosphito titanate here is used as a corrosion inhibitor, but it also causes increased self condensation of the polyurethane during drying. This results in a higher molecular weight polymer and may, to some extent, explain the apparent improved corrosion resistance.

| Formulation F | |
|---|---|
| Colloidal dispersion of aliphatic or aromatic polyurethane | 2.0 Parts by weight |
| Sodium tungstate | .5 Part by weight |
| Phosphito titanate | .02 Part by weight |
| Hexa methoxy methyl melamine | 1.0 Part by weight |
| Guiacol | .08 Part by weight |
| Water | 6.4 Parts by weight |

Note: In Formulation F, the titanate is a catalyst for the HMMM.

| Formulation G | |
|---|---|
| Colloidal dispersion of alphatic polyurethane | 2.5 Parts by weight |
| Sodium molybdate | .5 Part by weight |
| Aziridine catalyst | .05 Part by weight |

| | |
|---|---|
| -continued | |
| Guiacol | .1 Part by weight |
| Water | 6.85 Parts by weight |

The aliphatic and aromatic polyurethanes described in this disclosure are commerically available from at least the following two companies: Polyvinyl Chemicals Co. located at 730 Main Street, Wilmington, Mass. 01887, and Spencer Kellogg Co., a Division of Textron Corp., Buffalo, N.Y. 14240. The aliphatic polyurethane water dispersion is available from Polyvinyl Chemicals Company designated as R-960 and from Spencer Kellogg Co. designated as Spencer L-51 through L-55. The aromatic polyurethane water dispersion of the present invention is available from Spencer Kellogg Co. designated as Spensol L-44.

It is appreciated that other ingredients may be added to the coating composition such as fillers, pigments, dye stuffs, coloring agents, leveling agents and the like. These ingredients or components may be added depending upon the use to which the coating product is to be employed.

The process of simultaneously sealing and impregnating the unsealed anodic coating is carried out through the immersion of a freshly anodized aluminum substate surface, in a process vessel containing one of the above described compositions. The bath is maintained at about 170° F. (76.67° C.) to about 200° F. (93.33° C.) for 30 minutes to an hour, the time for the process being inversely related to the temperature of the bath. The anodic coating is converted from the unsealed condition to the sealed condition through hydration of the oxide. The structural characteristics of metal oxide monohydrate and metal oxide trihydrate are in accordance with the following reactions:

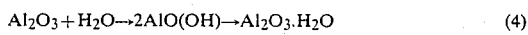
$$Al_2O_3 + H_2O \rightarrow 2AlO(OH) \rightarrow Al_2O_3.H_2O \qquad (4)$$

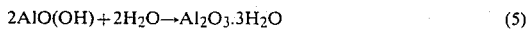
$$2AlO(OH) + 2H_2O \rightarrow Al_2O_3.3H_2O \qquad (5)$$

Following sealing/impregnation of the anodic coating, the anodized metal may be rinsed in water, or left unrinsed, followed by drying through exposure to the air, at ambient temperatures, for the purpose of curing. The cure may be affected over a period of time through self-condensation of the polyurethane resin. Although the part may be handled and stacked as soon as it is dry, this self-condensation continues thus providing a completed cure in three to seven days. Alternatively, the anodized metal is placed in a drying oven controlled at preferably 200° F. (93.33° C.) for the purpose of curing.

When melamine is added to the coating composition, the anodized metal, with rinsing if desired, is placed in a drying oven controlled at preferably 300° F. (148.88° C.) to 500° F. (260° C.) in order to cure the protective coating. This requires a cure time of about 1 to about 10 minutes, the time and temperature being inversely related. For example, at about 300° F. (148.88° C.) the cure time is approximately 10 minutes, at about 325° F. (162.77° C.) the cure time is approximately 8 minutes, at about 400° F. (204.44° C.) the cure time is approximately 5 minutes and at about 500° F. (259.99° C.) the cure time is approximately 1 minute, the time and temperature curing relationship being based on a 0.8 mil (20.32 microns) film thickness applied to clad aluminum stock. On occasion, it is desirable to allow the component to dry prior to the curing step, thereby eliminating the rinsing step after the simultaneous seal/impregnation step.

The foregoing describes a typical processing sequence which follows the conventional steps of preparing and anodizing the aluminum substrate. Such preparation for anodizing includes (a) degreasing, (b) alkaline cleaning, and (c) deoxidizing with intermediate water rinsing after each operation (a), (b) and (c). Anodizing may be accomplished using the electrolytes and process control parameters necessary to develop anodic coatings of, although not limited to, the chromic, sulfuric and modified sulfuric acid types followed by immediate water rinse. For a discussion of cleaning and finishing aluminum and aluminum alloys, see Metal Handbook, 8th Ed. (1964), Vol. 2, published by American Society for Metals, p.p 611–634, which is hereby incorporated by reference.

EXAMPLE 1

1. The component was vapor degreased using a trichloroethylene of 1,1,1-trichloroethane material and then left in the degreaser until dry.
2. The degreased component was cleaned for approximately 18 minutes in an inhibited alkaline cleaner of PH 11.8 to 13, active alkalinity of 20% to 25% by weight, concentration of approximately 5 oz. per gallon and maintained at about 170° F. (76.67° C.).
3. The component was then rinsed in ambient water (approximately 70° F. (21.11° C.)) for about 90 seconds.
4. The component was deoxidized for approximately 8 minutes in an aluminum deoxidizer compounded from 17 to 23 oz/gal (wt.) 66° B'e sulfuric acid, 3 to 5 oz/gal (wt.) sodium dichromate, and 0.6 to 0.8 oz/gal (wt.) ammonium bifluoride maintained at room temperature (approximately 70° F. (21.11° C.)).
5. The component was then rinsed in ambient water for approximately 2 minutes.
6. The component was then anodized for approximately 30 minutes in 15% 66° B'e sulfuric acid to 6 to 24 Volts (DC), 12 to 15 amps/ft.$^2$ and maintained at approximately 70° F. (21.11° C.).
7. The anodized component was rinsed in ambient water for approximately 2 minutes.
8. The component was then immersed for about one hour in the colloidal water borne organic resin coating material, "Formulation A", diluted one part water to 1 part "Formulation A", and maintained at 175°±5° F. (80°±2.8° C.).
9. Following this bath whereby the component was concurrently sealed and primed, it was air dried at ambient temperature for 60±5 minutes.
10. Finally, the component was cured by air drying for about seven days.

EXAMPLE 2

The component to be coated was prepared following the same steps 1 through 7 as in Example 1.

8. The component was then sealed and primed by a bath for approximately 30 minutes in the resin-contained water borne composition described above in Example 1 and maintained at 200° F.±5° F. (93.33±2.8° C.).
9. Following this bath the component was air dried and cured as in steps 9 and 10 of Example 1; however curing was effected for about one hour at a temperature of about 180°–200° F. (82.22°–93.33° C.) in this case.

We claim:

1. A protective coating composition for application to aluminum and aluminum alloy components during the sealing step of a typical anodizing process to seal and prime the component, said composition comprising:
   (a) a colloidal, water-borne polyurethane elastomer resin;
   (b) a cross-linking agent;
   (c) a thermosetting catalyst; and
   (d) a corrosion inhibiting agent.

2. The protective coating composition of claim 1 wherein said elastomer resin is a polyurethane resin formed from an aromatic, aliphatic or alicyclic isocyanate copolymer.

3. The protective coating composition of claim 2, wherein said copolymer is formed from isocyanate prepolymers based on such monomers as 2,4-toluene diisocyanate; 2,6-toluene diisocyanate; 1,4-cyclohexane diisocyanate; dicyclohexylmethane 4,4'-diisocyanate; xylene diisocyanate; 1-isocyanato-3-isocyanatomethyl-3,5,5-trimethylcyclohexane; hexamethylene diisocyanate; methylcyclohexyl diisocyanate or 2,4,4-trimethylhexylmethylene diisocyanate.

4. The protective coating composition of claim 1, wherein said cross-linking agent is aziridine or a substituted melamine.

5. The protective coating composition of claim 4, wherein said cross-linking agent is hexamethoxy methyl melamine.

6. The protective coating composition of claim 1, wherein said thermosetting catalyst is a Friedal-Krafts acid catalyst, a boron trifluoride or a titanate complex comprising pyrophosphate titanate or phosphite titanate.

7. The protective coating composition of claim 1 wherein said corrosion inhibiting agent is zinc, strontium, calcium, sodium, or potassium.

8. The protective coating composition of claim 1 wherein said corrosion inhibiting agent comprises soluble or unsoluble chromates, dichromates, tungstates or molybdates including amine complexes of molybdic or tungstic acids or organic titanate complexes.

9. A protective coating process for aluminum and aluminum alloy components comprising the steps of:
   (a) anodizing the component to be coated;
   (b) applying a coating composition comprising a colloidal, water-borne polyurethane resin, a cross-linking agent, a thermosetting catalyst and a corrosion-inhibiting agent to the anodized component at a temperature in the range of approximately 170° F. (76° C.) to about 200° F. (93° C.) for a period ranging from about 30 to 60 minutes, the time and temperature being inversely related whereby said composition seals and anodized component through hydration and simultaneously primes the anodized component; and
   (c) curing the sealed and primed component.

10. The process according to claim 9, wherein said curing step is carried out at a temperature in the range of approximately 300° F. (148° C.) to 500° F. (260° C.) for a period ranging from 10 minutes to 1 minute, the time and temperature being inversely proportional.

* * * * *